US009189433B2

(12) United States Patent
Dinkjian et al.

(10) Patent No.: US 9,189,433 B2
(45) Date of Patent: *Nov. 17, 2015

(54) TRACKING A RELATIVE ARRIVAL ORDER OF EVENTS BEING STORED IN MULTIPLE QUEUES USING A COUNTER

(71) Applicant: International Business Machines Corporation, Armonk, NY (US)

(72) Inventors: Robert M. Dinkjian, Round Rock, TX (US); Lyndsi R. Parker, Austin, TX (US); Giang C. Nguyen, Austin, TX (US); Bill N. On, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/718,267

(22) Filed: Dec. 18, 2012

(65) Prior Publication Data

US 2014/0173631 A1 Jun. 19, 2014

(51) Int. Cl.
*G06F 12/00* (2006.01)
*G06F 13/16* (2006.01)
(Continued)

(52) U.S. Cl.
CPC ............ *G06F 13/1673* (2013.01); *G06F 9/542* (2013.01); *G06F 12/00* (2013.01); *G06F 13/1668* (2013.01); *G06M 3/00* (2013.01); *G06F 2209/548* (2013.01)

(58) Field of Classification Search
CPC .. G06F 12/00; G06F 13/1668; G06F 13/1673
USPC .......................................................... 710/310
See application file for complete search history.

(56) References Cited

U.S. PATENT DOCUMENTS

| 4,969,120 A | 11/1990 | Azevedo et al. |
| 6,389,019 B1 | 5/2002 | Fan et al. |

(Continued)

FOREIGN PATENT DOCUMENTS

| CN | 100463451 | 2/2009 | |
| EP | 924623 A2 * | 6/1999 | .............. G06F 13/40 |

(Continued)

OTHER PUBLICATIONS

Dahl, et al, "Event List Management in Distributed Simulation", retrieved from the Internet on Nov. 3, 2012 from http://www.google.com/url?sa=t&rct=j&q=&esrc=s&source=web&cd=2&ved=0CCsQFjAB&url=http%3A%2F%2Fciteseerx.ist.psu.edu%2Fviewdoc%2Fdownload%3Fdoi%3D10.1.1.75.4478%26rep%3Drep1%26type%3Dpdf&ei=jFKYUMDBIPSA2AXsolHIAw&usg=AFQjCNH_aOXewEr9tMiEU4jdj0UTiLNcTA&sig2=nPJ1qoaQJpPNcHdmMSQplg, 8 pages.

(Continued)

Primary Examiner — Brian W Wathen
(74) Attorney, Agent, or Firm — Parashos T. Kalaitzis; Amy J. Pattillo

(57) ABSTRACT

An order controller stores each received event in a separate entry in one of at least two queues with a separate counter value set from an arrival order counter at the time of storage, wherein the arrival order counter is incremented after storage of each of the received events and on overflow the arrival order counter wraps back to zero. The order controller calculates an absolute value of the difference between a first counter value stored with an active first next entry in a first queue from among the at least two queues and a second counter value stored with an active second next entry in a second queue from among the at least two queues. The order controller compares the absolute value with a counter midpoint value to determine whether the first counter value was stored before the second counter value.

11 Claims, 11 Drawing Sheets

(51) Int. Cl.
*G06M 3/00* (2006.01)
*G06F 9/54* (2006.01)

(56) References Cited

U.S. PATENT DOCUMENTS

| | | | |
|---|---|---|---|
| 6,556,572 | B1 | 4/2003 | Ishida |
| 6,877,077 | B2 | 4/2005 | McGee et al. |
| 7,177,982 | B2 | 2/2007 | Barrick |
| 7,230,923 | B2 | 6/2007 | Onvural et al. |
| 7,400,629 | B2 | 7/2008 | Blanc et al. |
| RE40,904 | E | 9/2009 | Garde |
| 8,028,052 | B2 | 9/2011 | Larkin et al. |
| 8,099,452 | B2 | 1/2012 | Chkodrov et al. |
| 8,131,895 | B2 | 3/2012 | Pope et al. |
| 8,171,205 | B2 | 5/2012 | Royer et al. |
| 2004/0190537 | A1 | 9/2004 | Ferguson et al. |
| 2005/0053078 | A1 | 3/2005 | Blanc et al. |
| 2007/0260777 | A1 | 11/2007 | Timpe et al. |
| 2008/0072221 | A1 | 3/2008 | Chkodrov et al. |
| 2010/0054268 | A1 | 3/2010 | Divivier |
| 2012/0131246 | A1 | 5/2012 | Jeong et al. |
| 2012/0281703 | A1 | 11/2012 | Agerholm et al. |

FOREIGN PATENT DOCUMENTS

| | | | |
|---|---|---|---|
| EP | 0924623 | A3 | 5/2000 |
| EP | 1615378 | A1 | 1/2006 |
| WO | 2011067406 | | 6/2011 |

OTHER PUBLICATIONS

U.S. Appl. No. 14/474,087, filed Aug. 30, 2014, In re Liu, 42 pages.
U.S. Appl. No. 14/449,666, filed Aug. 1, 2014, In Re Liu, 59 pages.
U.S. Appl. No. 13/738,204, filed Jan. 10, 2013, In re Dinkjian, 44 pages.
Non-Final Office Action, mailing date Oct. 3, 2014, U.S. Appl. No. 13/738,204, filed Jan. 10, 2013, in re Dinkjian, 45 pages.
Hsieh, Y.; Levitan, S., "Abstraction Techniques for Verification of Multiple Tightly Coupled Counters, Registers and Comparators" (2010), pp. 1-6 [retrieved from http://citeseerx.ist.psu.edu/viewdoc/download?doi=10.1.1.31.8659&rep=rep1&type=pdf].
Notice of Allowance, mailing date Feb. 2, 2015, U.S. Appl. No. 13/738,204, filed Jan. 10, 2013, In re Dinkjian, 44 pages.
Notice of Allowance, mailing date May 18, 2015, U.S. Appl. No. 13/738,204, filed Jan. 10, 2013, In re Dinkjian, 12 pages.
Anandkumar et al, "Seeing Through Black Boxes: Tracking Transactions through Queues under Monitoring Resource Constraints", Feb. 9, 2010, accessed online from <http://www.mit.edu/~animakum/pubs/AnandkumarPE10.pdf>, 23 pages.

* cited by examiner

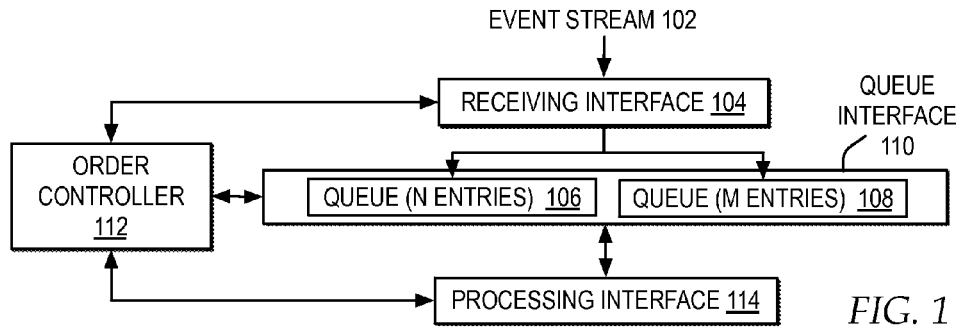
FIG. 1
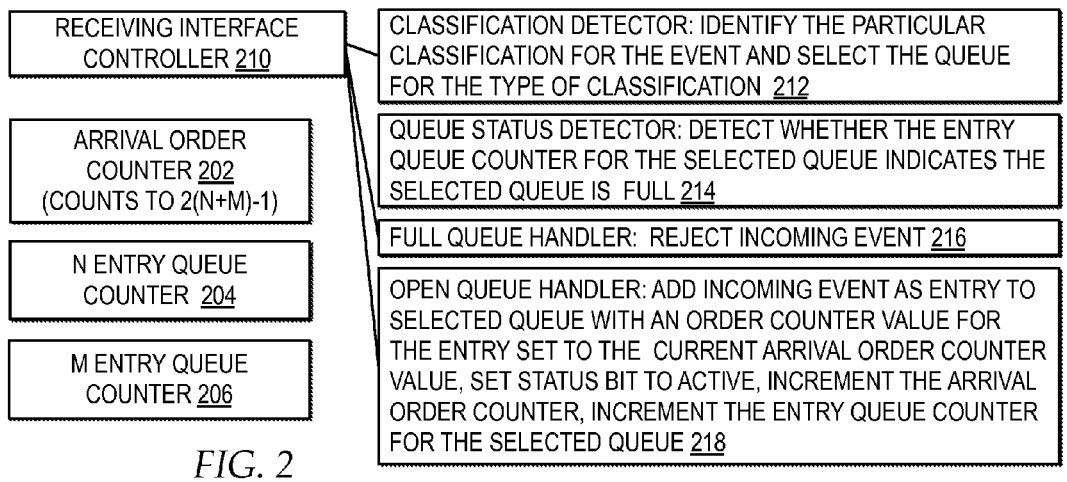
FIG. 2
EACH QUEUE ENTRY 302:
| EVENT REGISTER 304 | ORDER COUNTER REGISTER 306 | STATUS BIT REGISTER 308 |
|---|---|---|
| EVENT IDENTIFIER 310 (ATTRIBUTES: STARTING ADDRESS, SIZE OF TRANSACTION, BYTE-ENABLE) | ORDER COUNTER VALUE 312 (THE ARRIVAL ORDER COUNTER VALUE TO INDICATE ARRIVAL ORDER) | STATUS BIT 314 (STATUS BIT TO INDICATE WHETHER THE EVENT IS PENDING (ACTIVE)(1) OR HAS BEEN PROCESSED (DONE)(0) |
FIG. 3

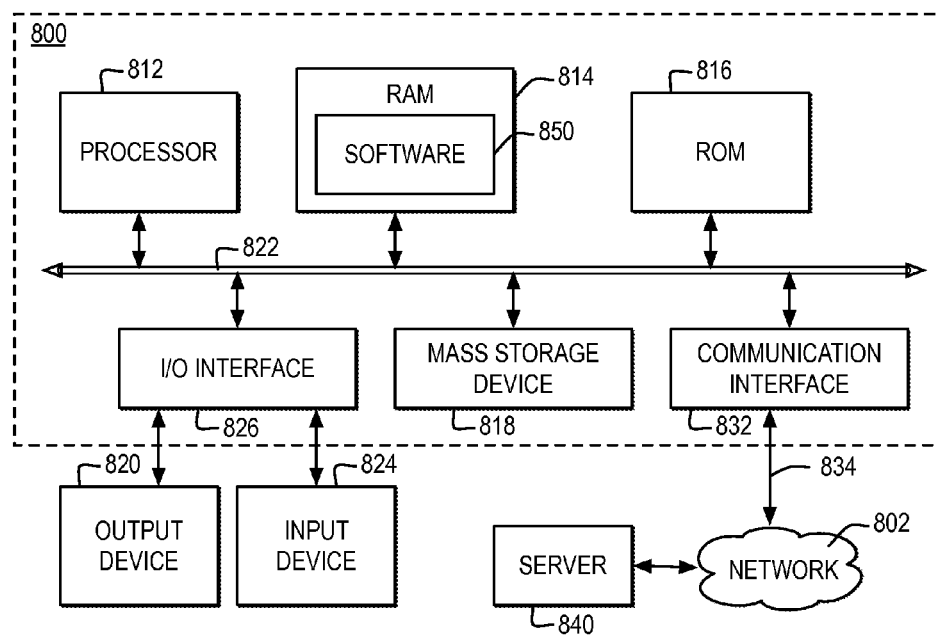

US 9,189,433 B2

TRACKING A RELATIVE ARRIVAL ORDER OF EVENTS BEING STORED IN MULTIPLE QUEUES USING A COUNTER

TECHNICAL FIELD

The embodiment of the invention relates generally to managing queues and particularly to tracking a relative arrival order of events being stored in multiple queues when a counter value from a counter is stored with each arriving event to indicate arrival order and the counter is incremented with each arriving event, where the counter wraps back to zero on overflow.

DESCRIPTION OF THE RELATED ART

In electronic systems that handle streams of events, one or more queues are often positioned to store events until the events can be processed. When events arriving in a stream are stored into multiple, separate queues, if an in-order setting is designated, the events may need to be processed from the queues in the same order that the events arrived in the stream.

BRIEF SUMMARY

In view of the foregoing, there is a need for a method, system, and computer program product for calculating a relative arrival order of events being stored in multiple queues when a counter value from a counter is stored with each arriving event to indicate arrival order and the counter is incremented with each arriving event, where the counter wraps back to zero on overflow.

In another embodiment, a system for tracking a relative arrival order of events stored in at least two queues comprises an order controller, implemented in at least one hardware component, operative to store each received event in a separate entry from among multiple entries in one of at least two queues with a separate counter value set from an arrival order counter at the time of storage, wherein the arrival order counter is incremented after storage of each of the received events and on overflow the arrival order counter wraps back to zero. The order controller is operative to calculate an absolute value of the difference between a first counter value stored with an active first next entry from among the multiples entries in a first queue from among the at least two queues and a second counter value stored with an active second next entry from among the multiple entries in a second queue from among the at least two queues. The order controller is operative to compare the absolute value with a counter midpoint value to determine whether the first counter value was stored before the second counter value in an arrival order of the received events.

In another embodiment, a computer program product for tracking a relative arrival order of events stored in at least two queues comprises one or more computer-readable tangible storage devices. The computer program product comprises program instructions, stored on at least one of the one or more storage devices, to store each of a plurality of received events in a separate entry from among a plurality of entries in one of at least two queues with a separate counter value set from an arrival order counter at the time of storage, wherein the arrival order counter is incremented after storage of each of the plurality of received events and on overflow the arrival order counter wraps back to zero. The computer program product comprises program instructions, stored on at least one of the one or more storage devices, to calculate an absolute value of the difference between a first counter value stored with an active first next entry from among the plurality of entries in a first queue from among the at least two queues and a second counter value stored with an active second next entry from among the plurality of entries in a second queue from among the at least two queues. The computer program product comprises program instructions, stored on at least one of the one or more storage devices, to compare the absolute value with a counter midpoint value to determine whether the first counter value was stored before the second counter value.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 illustrates a block diagram of one example of an system in which the relative arrival order is tracked for events being stored in multiple queues;

FIG. 2 illustrates a block diagram of one example of components of an order controller for a multiple queue interface for handling selection of an available queue for arriving events and tracking the relative arrival order of events placed in one of the multiple queues;

FIG. 3 illustrates a block diagram of one example of values stored with each queue entry, including an order counter value and a status bit;

FIG. 7A-7B illustrate a block diagram of one example of an order controller for tracking a relative arrival order of events being stored in multiple queues where the depth of each queue is set to eight entries;

FIG. 8 illustrates a block diagram of one example of a computer system in which one embodiment of the invention may be implemented;

FIG. 9 illustrates a block diagram of one example of

DETAILED DESCRIPTION

Figure 4:
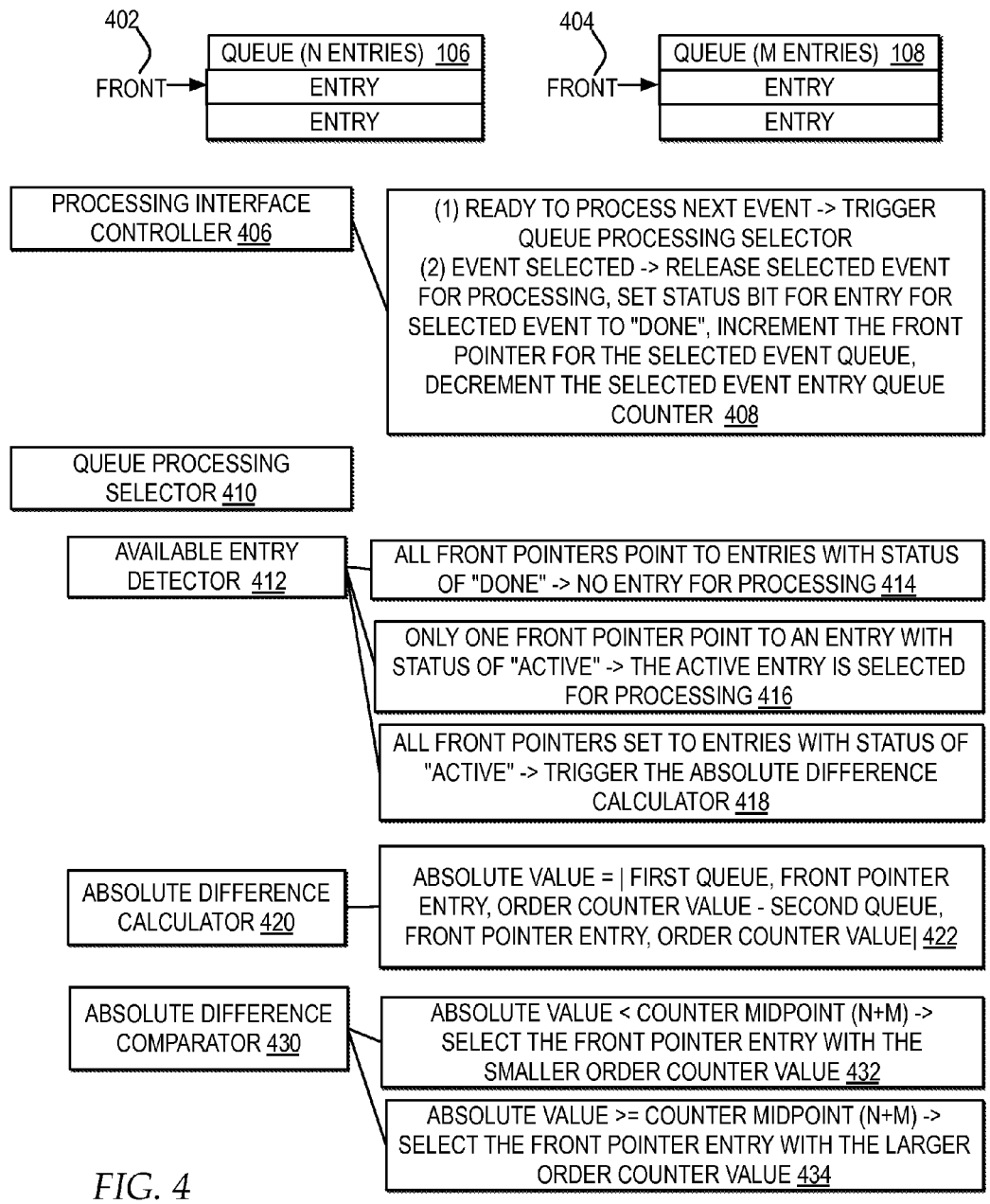
FIG. 4 illustrates a block diagram of examples of components of an order controller for a multiple queue interface for handling event selection of events placed in one of multiple queues to be processed from the queues in order of arrival.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

FIG. 1 illustrates a block diagram of one example of an system in which the relative arrival order is tracked for events being stored in multiple queues.

In the example, a receiving interface 104 receives event stream 102 from one or more devices. In the example, event stream 102 may represent a stream of events arriving in a particular order at receiving interface 104 from one or more devices over one or more periods of time. In the example, receiving interface 104 identifies one or more classifications of each event received in event stream 102 and selects a queue associated with each event, based on the classification, from among one or more queues in a queue interface 110. In one example, receiving interface 104 may identify whether each event in event stream 102 is classified as a read request or as a write request.

In the example, queue interface 110 includes a queue 106 of a depth of N entries and a queue 108 of a depth of M entries. In one example, only events classified as read requests in event stream 102 are stored in queue 106 and only events classified as write requests in event stream 102 are stored in queue 108. In other embodiments, queue interface 110 may include a single queue or may include additional queues. In one embodiment, the depth of N entries of queue 106 is equal to the depth of M entries of queue 108. In another embodiment, the depth of N entries of queue 106 is not equal to the depth of M entries of queue 108.

In the example, an order controller 112 may send control signals to and between one or more of receiving interface 104, queue interface 110, and a processing interface 114. In another embodiment, one or more components of order controller 112 may be implemented within one or more interfaces or order controller 112 may be implemented through multiple separate controllers.

In one example, order controller 112 controls whether events received in event stream 102 at receiving interface 104 are rejected or placed in a queue. In addition, order controller 112 controls the selection of the particular queue in which a non-rejected event is placed within queue interface 110. Further, order controller 112 controls tracking of the relative arrival order of each event in each queue by storing a order counter value in an order counter register with each event in each queue, where the counter value is set by an arrival order counter that increments for each event arrival and wraps back to zero on overflow. In addition, in the example, order controller 112 controls the selection of the next active event from among queue 106 and queue 108 to be processed by processing interface 114 by determining, based on the order counter values assigned to each next active event entry in queue 106 and queue 108, which of the order counter values is the oldest, and marks the selected event entry as no longer active. In one example, order controller 112 determines which of the order counter values assigned to each of the next active events was stored first, and therefore is the oldest, by calculating an absolute value of the difference between the order counter values assigned to the next two active events and comparing the absolute value against a counter midpoint value to determine whether to select the next active entry stored with the smaller or larger of the order counter values. In particular, by calculating the absolute value of the differences between the order counter values assigned to the next two active events and comparing the absolute value against the counter midpoint value to determine which counter value was stored first, the arrival order of the next two active events can be tracked from the order counter values stored with the events, but independent of an actual sequential order shown in the order counter values.

In the example, by calculating an absolute value of the difference between the order counter values assigned to the next two active events and comparing the absolute value against a counter midpoint value to determine whether to select the next active entry stored with the smaller or larger of the order counter values, a counter value alone may be stored with each event entry to track the relative arrival order of events placed in multiple queues, without necessitating any additional counting of an overflow of a counter and without necessitating a larger counter. In one example, the arrival order counter is set to count to "2(N+M)−1" and the counter midpoint value is set to "N+M", where N is the depth of entries in queue 106 and M is the depth of entries in queue 108, and where an entry pointed to with a smaller order counter value is selected if an absolute value is less than the counter midpoint value. In another example, the arrival order counter may be set to a different count, such as a count of "4(N+M)−1" and the counter midpoint value may be set to a different midpoint of the value countered to by the arrival order counter, such as a value of "2(N+M)". In another example, the counter midpoint value may be set to a value within a range of the midpoint of the arrival order counter. In another example, where queue interface 110 includes more than two queues, multiple arrival order counters may be implemented and multiple counter midpoint values may be set.

FIG. 2 illustrates a block diagram of one example of components of an order controller for a multiple queue interface for handling selection of an available queue for arriving events and tracking the relative arrival order of events placed in one of the multiple queues.

In the example, order controller 112 includes, for handling an incoming event stream, an N entry queue counter 204 set to count N entries and an M entry queue counter 206, set to count M entries, where order controller 112 uses N entry queue counter 204 to count the number of active entries in queue 106 and uses M entry queue counter 206 to count the number of active entries in queue 108.

In the example, order controller 112 includes, for handling an incoming event stream, an arrival order counter 202. In one example, arrival order counter 202 is set to count to a value equal to "2(N+M)−1", where N is the number of entries in queue 106 and M is the number of entries in queue 108. When the count in arrival order counter 202 overflows, arrival order counter 202 wraps back to zero. In the example, arrival order counter 202 may be set to count to alternate values.

In the example, a receiving interface controller 210 handles incoming events in event stream 102. In one example, receiving interface controller 210 handles incoming events in event stream 102 through a classification detector 212 that identifies a particular classification for each event and selects the queue associated with the particular classification. In one example, a queue status detector 214 detects whether the entry queue counter for the selected queue, from among N entry queue counter 204 and M entry queue counter 206, indicates the selected queue is full. In the example, if queue status detector 214 detects that the selected queue is full, a full queue handler 216 rejects the incoming event. In one example, queue status detector 214 efficiently detects whether an incoming entry can be added to a selected queue or not by checking whether the counter value in the entry queue counter for the selected queue is set to a value indicating all the entries are active and the queue is full. As order controller 112 selects queue entries for processing by processing interface 114, order controller 112 reduces the count in the entry queue counter associated with the queue from which the entry is processed so that the value in each of N entry queue counter 204 and M entry queue counter 206 reflects the current number of active entries in each queue.

In the example, if queue status detector 214 detects that the selected queue is not full, an open queue handler 218 controls adding the incoming event as an entry to the selected queue from among queue 106 and queue 108 with an order counter value for the entry set to the current counter value set in arrival order counter 202, sets a status bit for the entry to "active", increments arrival order counter 202, and increments the entry queue counter for the selected queue from among N entry queue counter 204 and M entry queue counter 206. In the example, by setting arrival order counter 202 to count up to "2(N+M)−1" and by storing each event entry with an order counter value set to the current arrival order counter value in arrival order counter 202, the order counter value stored with each event entry in each queue allows order controller 112 to efficiently track the relative arrival order of each entry in each of queue 106 and queue 108 even when arrival order counter 202 overflows and wraps back to zero.

FIG. 3 illustrates one example of values stored with each queue entry, including an order counter value and a status bit. In the example, as illustrated at reference numeral 302, each queue entry in queue 106 and queue 108 may include, but is not limited to, an event register 304 for storing an event identifier 310, an order counter register 306 of same length as arrival order counter 202 for storing an order counter value 312, and a status bit register 308 for storing a status bit 314 of one-bit length. In the example, event identifier 310 may include one or more attributes such as a starting address of the event, a size of the transaction, and a byte-enable setting. In the example, order counter value 312 may include the arrival order counter value at the time of arrival to indicate arrival order. In the example, status bit 314 may include a status bit set in a status bit register to indicate whether the event is pending, or "active", or has been processed, or is "done". In additional or alternate examples, each queue entry, as illustrated at reference numeral 302, may include additional or alternate data.

FIG. 4 illustrates a block diagram of one example of components of an order controller for a multiple queue interface for handling event selection of events placed in one of multiple queues to be processed from the queues in order of arrival.

In the example, order controller 112 manages a separate front pointer for each of queue 106 and queue 108. In the example, a front pointer 402 points to entries in queue 106 and a front pointer 404 points to entries in queue 108. Front pointer 402 and front point 404 are initially set to zero and point to the next entry to be handled in each queue. When an entry is released from one of queue 106 and queue 108 to processing interface 114, the front pointer for the queue is incremented one position, to point to the next entry to be handled. In the example, if either of front pointer 402 or front pointer 404 points to an entry and the status bit for the entry is set to "done", then there are no entries left in the queue to be handled.

In the example, order controller 112 may include a processing interface controller 404 for handling selection of the next event to process from among the events in queue 106 and queue 108. In the example, as illustrated at reference numeral 406, processing interface controller 404 triggers a queue processing selector 408 to determine the next event to process. In the example, as illustrated at reference numeral 406, once queue processing selector 408 selects an event to be processed, processing interface controller 404 releases the selected event to be processed, sets the status bit for the entry for the selected event to "done", increments the front pointer for the selected event queue from among front pointer 402 and front pointer 404, and decrements the selected event entry queue counter from among N entry queue counter 204 and M entry queue counter 206.

In the example, queue processing selector 408 may include an available entry detector 412. Available entry detector 412 examines the status bit assigned to the entry pointed to by each of front pointer 402 and front pointer 404. As illustrated at reference numeral 414, if both front pointer 402 and front pointer 404 point to entries with each with a status bit set to "done", then no entry is selected for processing. As illustrated at reference numeral 416, if only one of front pointer 402 and front pointer 404 point to an entry with a status bit set to "active", then the entry pointed to with the status bit set to "active" is selected for processing. As illustrated at reference numeral 418, if both front pointer 402 and front pointer 404 each point to an entry with a status bit set to "active", then an absolute difference calculator 420 is triggered. Absolute difference calculator 420 calculates an absolute value of the difference between the first queue, front pointer entry, order counter value and the second queue, front pointer entry, order counter value, as illustrated at reference numeral 422. In the example, an absolute value of a calculated number is the non-negative value of the number without regard to the sign. For example, the absolute value of "1" is "1" and the absolute value of "−1" is also "1".

In the example, an absolute difference comparator 430 compares the absolute value with a counter midpoint value, such as "N+M". As illustrated at reference numeral 432, if the absolute value is less than the counter midpoint value, then the front pointer entry with the smaller order counter value is selected. As illustrated at reference numeral 434, if the absolute value is greater than or equal to the counter midpoint value, then the front pointer entry with the larger order counter value is selected.

Figure 5A:
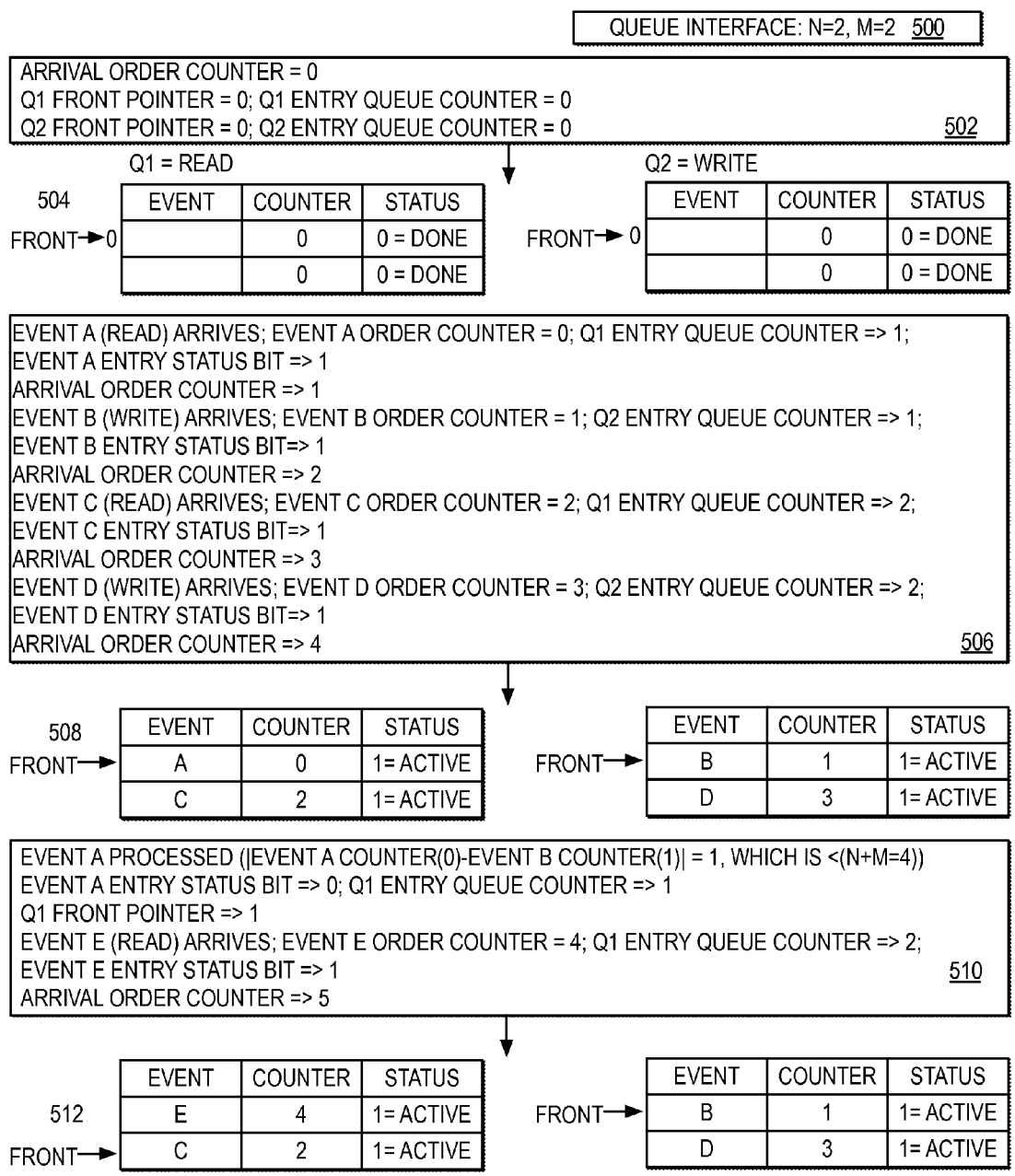
FIGS. 5A, 5B, and 5C illustrate a block diagram of one example of an order controller tracking a relative arrival order of events being stored in multiple queues when a counter value from a counter is stored with each arriving event to indicate arrival order and the counter is incremented with each arriving event, where the counter wraps back to zero on overflow.
Figure 5B:
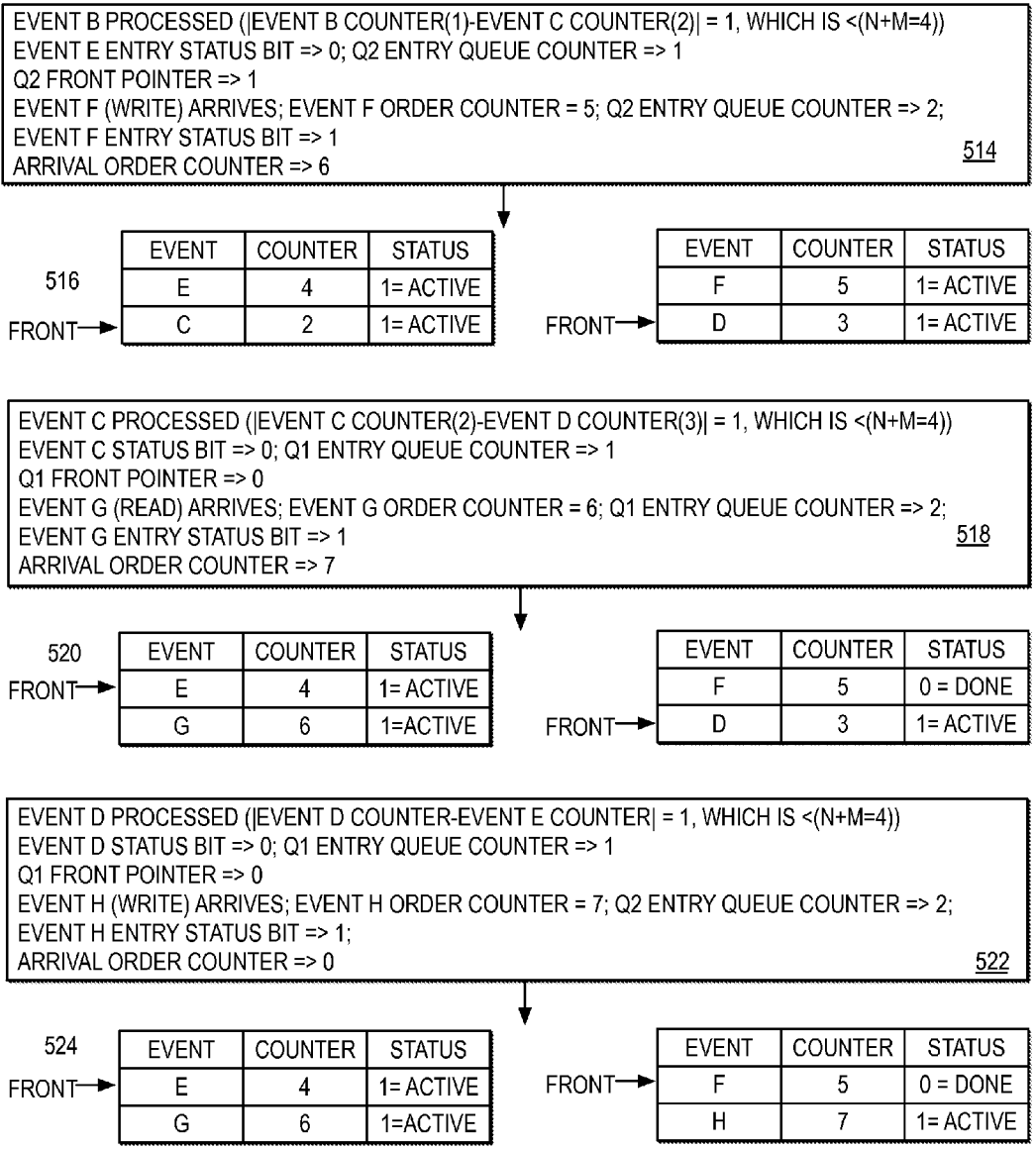
Figure 5C:
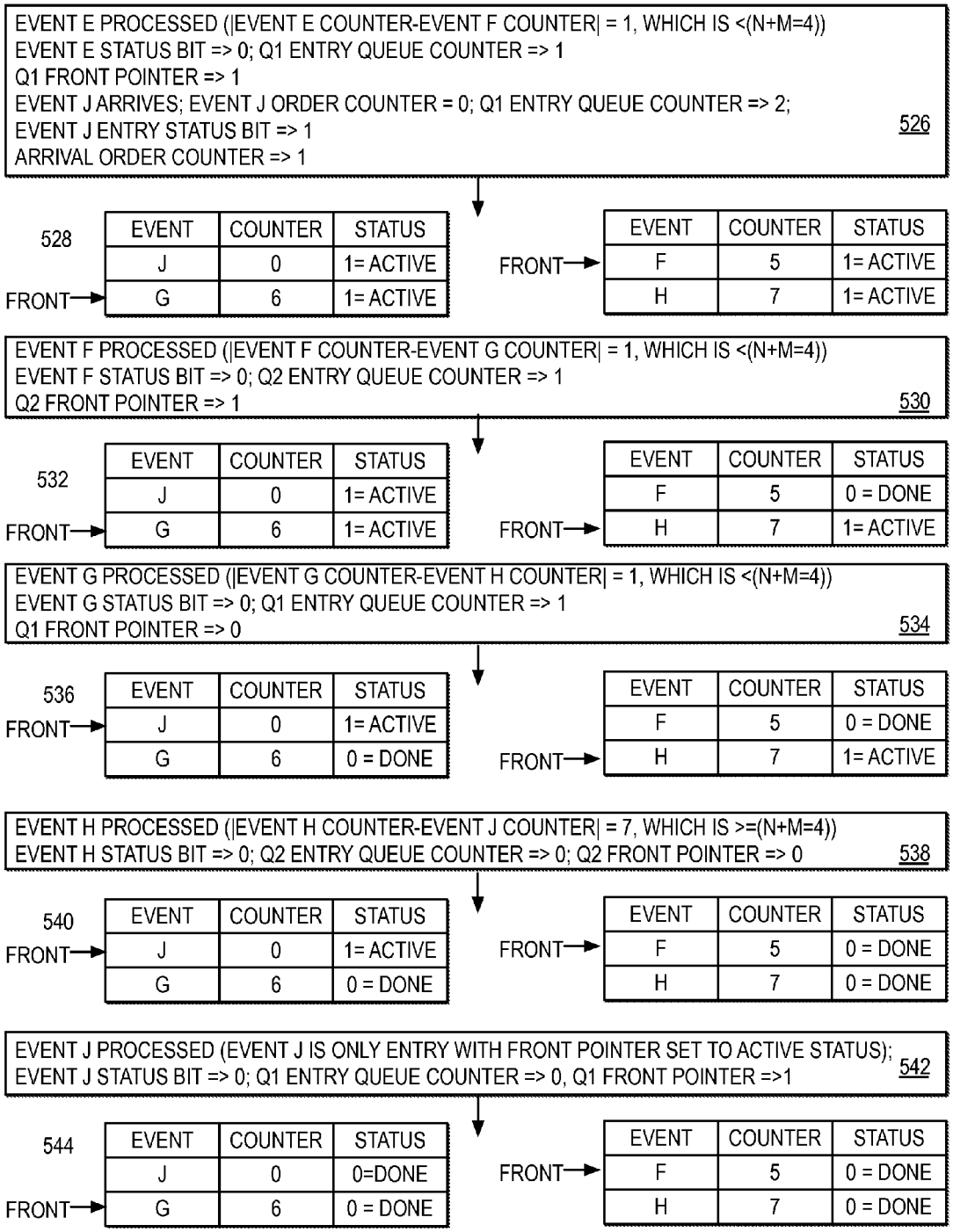

FIGS. 5A, 5B, and 5C illustrate a block diagram of one example of an order controller tracking a relative arrival order of events being stored in multiple queues when a counter value from a counter is stored with each arriving event to indicate arrival order and the counter is incremented with each arriving event, where the counter wraps back to zero on overflow.

In the example, an event stream is illustrated for two queues, where N is set to a depth of 2 entries and M is set to a depth of 2 entries, as illustrated at reference numeral 500. In the example, as illustrated in a sequence 502, an arrival order counter, a first queue (Q1) front pointer, a Q1 entry queue counter, a second queue (Q2) front pointer, and a Q2 entry queue counter are all set to "0". In the example, as illustrated in a queue status 504, the front pointer of each of Q1 and Q2 points to the entry set to "0", which is the first entry in each queue, the order counter value for each entry in each of Q1 and Q2 is set to "0" and the status bit for each entry in each of Q1 and Q2 is set to "0", which is the "done" status bit setting.

In the example, Q1 is designated for storing events classified as "read" events and Q2 is designated for storing events classified as "write" events. In the example, as illustrated in a sequence 506 and a queue status 508, an event A arrives, which is classified as a read event and placed in the first open queue entry of Q1, with the Q1 entry queue counter incremented to "1", an event A order counter value set to the current arrival order counter value of "0", and an event A status bit set to "1". Next, as illustrated in sequence 506 and queue status 508, the arrival order counter is incremented to "1" and an event B arrives, which is classified as a write event and placed in the first open queue entry of Q2, with the Q2 entry queue counter incremented to "1", an event B order counter value set to the current arrival order counter value of "1", and an event B status bit set to "1". Next, as illustrated in sequence 506 and queue status 508, the arrival order counter is incremented to "2" and an event C arrives, which is classified as a read event and placed in the next open queue entry of Q1, with the Q1 entry queue counter incremented to "2", an event C order counter value set to the current arrival order counter value of "2", and an event C status bit set to "1". Next, as illustrated in sequence 506 and queue status 508, the arrival order counter is incremented to "3" and an event D arrives, which is classified as a write event and placed in the next open queue entry of Q2, with the Q2 entry queue counter incremented to "2", an event D order counter value set to the current arrival order counter value of "3", and an event D status bit set to "1". Next, as illustrated in sequence 506, the arrival order counter is incremented to "4".

In the example, as illustrated in a sequence 510, from among event A pointed to by the Q1 front pointer and event B pointed to by the Q2 front pointer, both with status bits set to "active", event A is selected to be processed. In particular, in the example, an absolute value of the difference between the event A order counter of "0" and the event B order counter of "1" is calculated, which is "1". In the example, the absolute value of "1" is less than "N+M", which is "4", therefore the entry with the smaller order counter is selected for processing, which is entry A with the order counter of "0". As illustrated in sequence 510 and a queue status 512, the event A entry status bit is set to "0", the Q1 entry queue counter is decremented to "1", and the Q1 front pointer is incremented to "1" and points to the entry for event C. Next, as illustrated in sequence 510 and queue status 512, event E arrives, which is classified as a read event and placed in the first open entry in Q1, with the Q1 entry queue counter incremented to "2", the event E order counter value set to the current arrival order counter value of "4", and an event E status bit set to "1". Next, as illustrated in sequence 510, the arrival order counter is incremented to "5".

In the example, as illustrated in a sequence 514, from among event C pointed to by the Q1 front pointer and event B pointed to by the Q2 front pointer, both with status bits set to "1", event B is selected to be processed. In particular, in the example, the absolute value of the difference between the event B order counter of "1" and the event C order counter of "2" is calculated, which is "1". In the example, the absolute value of "1" is less than "N+M", which is "4", therefore the entry with the smaller order counter is selected for processing, which is entry B with the order counter of "1". As illustrated in sequence 514 and a queue status 516, the event B status bit is set to "0", the Q2 entry queue counter is decremented to "1", and the Q2 front pointer is incremented to "1" and points to the entry for event D. Next, as illustrated in sequence 514 and queue status 516, event F arrives, which is classified as a write event and placed in the first open entry in Q2, with the Q2 entry queue counter incremented back to "2", the event F order counter value set to the current arrival order counter value of "5", and an event F status bit set to "1". Next, as illustrated in sequence 514, the arrival order counter is incremented to "6".

In the example, as illustrated in a sequence 518, from among event C pointed to by the Q1 front pointer and event D pointed to by the Q2 front pointer, both with status bits set to "1", event C is selected to be processed. In particular, in the example, the absolute value of the difference between the event C order counter of "2" and the event D order counter of "3" is calculated, which is "1". In the example, the absolute value of "1" is less than "N+M", which is "4", therefore the entry with the smaller order counter is selected for processing, which is entry C with the order counter of "2". As illustrated in sequence 518 and a queue status 520, the event C status bit is set to "0", the Q1 entry queue counter is decremented to "1", and the Q1 front pointer is incremented and overflows to "0", pointing to the entry for event E. Next, as illustrated in sequence 518 and queue status 520, event G arrives, which is classified as a read event and placed in the first open entry in Q1, with the Q1 entry queue counter incremented back to "2", the event G order counter value set to the current arrival order counter value of "6", and an event G status bit set to "1". Next, as illustrated in sequence 518, the arrival order counter is incremented to "7".

In the example, as illustrated in a sequence 522, from among event E pointed to by the Q1 front pointer and event D pointed to by the Q2 front pointer, both with status bits set to "1", event D is selected to be processed. In particular, in the example, the absolute value of the difference between the event D order counter of "3" and the event E order counter of "4" is calculated, which is "1". In the example, the absolute value of "1" is less than "N+M", which is "4", therefore the entry with the smaller order counter is selected for processing, which is entry D with the order counter of "3". As illustrated in sequence 522 and a queue status 524, the Q2 entry queue counter is decremented to "1", the Q2 front pointer is incremented and overflows to "0", pointing to the entry for event F. Next, as illustrated in sequence 522 and queue status 524, event H arrives, which is classified as a write event and placed in the first open entry in Q2, with the Q2 entry queue counter incremented back to "2", the event H order counter value set to the current arrival order counter value of "7", and an event H status bit set to "1". Next, as illustrated in sequence 522, the arrival order counter is incremented and overflows to "0".

In the example, as illustrated in a sequence 526, from among event E pointed to by the Q1 front pointer and event F pointed to by the Q2 front pointer, both with status bits set to "1", event E is selected to be processed. In particular, in the example, the absolute value of the difference between the event E order counter of "4" and the event F order counter of "5" is calculated, which is "1". In the example, the absolute value of "1" is less than "N+M", which is "4", therefore the entry with the smaller order counter is selected for processing, which is entry E with the order counter of "4". As illustrated in sequence 526 and a queue status 528, the Q1 entry queue counter is decremented to "1", and the Q1 front pointer is incremented to "1", pointing to the entry for event G. Next, as illustrated in sequence 526 and queue status 528, event J arrives, which is classified as a read event and placed in the first open entry in Q1, with the Q1 entry queue counter incremented back to "2", the event J order counter value set to the current arrival order counter value of "0", and an event J status bit set to "1". Next, as illustrated in sequence 526, the arrival order counter is incremented to "1".

In the example, as illustrated in a sequence 530, from among event G pointed to by the Q1 front pointer and event F pointed to by the Q2 front pointer, both with status bits set to "1", event F is selected to be processed. In particular, in the example, the absolute value of the difference between the event F order counter of "5" and the event G order counter of "6" is calculated, which is "1". In the example, the absolute value of "1" is less than "N+M", which is "4", therefore the entry with the smaller order counter is selected for processing, which is entry F with the order counter of "5". As illustrated in sequence 530 and a queue status 532, the event F status bit is set to "0", the Q2 entry queue counter is decremented to "1", and the Q2 front pointer is incremented to "1", pointing to the entry for event H.

In the example, as illustrated in a sequence 534, from among event G pointed to by the Q1 front pointer and event H pointed to by the Q2 front pointer, both with status bits set to "1", event G is selected to be processed. In particular, in the example, the absolute value of the difference between the event G order counter of "6" and the event H order counter of "7" is calculated, which is "1". In the example, the absolute value of "1" is less than "N+M", which is "4", therefore the entry with the smaller order counter is selected for processing, which is entry G with the order counter of "6". As illustrated in sequence 534 and a queue status 536, the event G status bit is set to "0", the Q1 entry queue counter is decremented to "1", and the Q1 front pointer is incremented and overflows to "0", pointing to the entry for event J.

In the example, as illustrated in a sequence 538, from among event J pointed to by the Q1 front pointer and event H pointed to by the Q2 front pointer, both with status bits set to "1", event H is selected to be processed. In particular, in the example, the absolute value of the difference between the event H order counter of "7" and the event J order counter of "0" is calculated, which is "7". In the example, the absolute value of "7" is greater than "N+M", which is "4", therefore the entry with the larger order counter is selected for processing, which is entry H with the order counter of "7". As illustrated in sequence 538 and a queue status 540, the event H status bit is set to "0", the Q2 entry queue counter is decremented to "0", and the Q2 front pointer is incremented and overflows to "0", pointing to event F, which already has a status bit set to "done".

In the example, as illustrated in a sequence 542 and a queue status 544, event J is selected to be processed. In particular, in the example, event J is the only entry with a front pointer set to a status bit set to "active", therefore event J is selected to be processed, the status bit for event J is set to "0", the Q1 entry queue counter is decremented to "0", and the Q1 front pointer is incremented to "1". As illustrated in queue status 542, both the Q1 front pointer and the Q2 front pointer both point to entries with a status of "0", therefore there are no entries remaining to be processed in Q1 and Q2.

Figure 6:
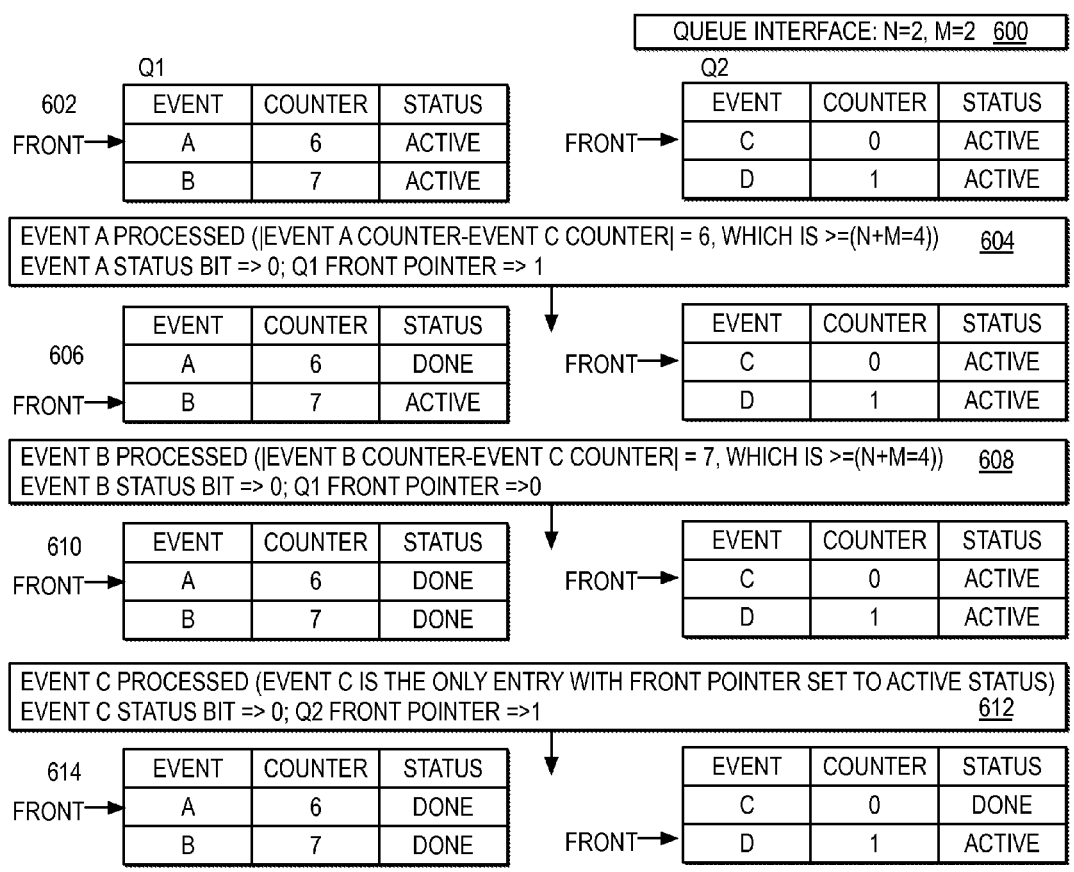
FIG. 6 illustrates one example of a block diagram of one example of an order controller tracking a relative arrival order of events being stored in multiple queues where multiple consecutive calculated absolute values are larger than a counter midpoint value.

FIG. 6 illustrates a block diagram of one example of an order controller for tracking a relative arrival order of events being stored in multiple queues where multiple consecutive calculated absolute values are larger than a counter midpoint value. In the example, an event stream is illustrated for two queues, where N is set to a depth of 2 entries and M is set to a depth of 2 entries, as illustrated at reference numeral 600.

In the example, as illustrated in a queue status 602, a first queue (Q1) currently includes a first event entry for event A, with an order counter of "6" and a status bit set to "active, and a second event entry for event B, with an order counter of "7" and a status bit set to "active". In addition, as illustrated in queue status 602, a second queue (Q2) currently includes a first event entry for event C, with an order counter of "0" and a status bit set to "active", and a second event entry for event D, with an order counter of "1" and a status bit set to "active". In the example, a Q1 front pointer points to the first entry in Q1 for event A and a Q2 front pointer points to a first entry in Q2 for event C.

In the example, as illustrated in a sequence 604, from among event A and event C, both with status bits set to "active", event A is selected to be processed next. In particular, in the example, the absolute value calculated is the absolute value of the difference between the event A order counter of "6" and the event C order counter of "0", which is "6". In the example, the absolute value of "6" is greater than "N+M", which is "4", therefore the entry with the larger order counter is selected for processing, which is entry A with the order counter of "6". In the example, as illustrated in sequence 604, the status bit for event A is set to "done" and the Q1 front pointer is incremented to "1", pointing to event B, as illustrated in queue status 606. In the example, in queue status 606, the Q1 event pointer points to event B and the Q2 event pointer points to event C.

Next, in the example, as illustrated in sequence 608, from among event B and event C, both with status bits set to "active", event B is selected to be processed next. In particular, in the example, the absolute value calculated is the absolute value of the difference between the event B order counter of "7" and the event C order counter of "0", which is "7". In the example, the absolute value of "7" is greater than "N+M", which is "4", therefore the entry with the larger order counter is selected for processing, which is entry B with the order counter of "7". In the example, as illustrated in sequence 608, the status bit for event B is set to "done" and the Q1 front pointer is incremented and wraps back to "0", pointing to event A, which is "done", as illustrated in queue status 610.

Next, in the example, as illustrated in sequence 612, from among the Q1 front pointer and the Q2 front pointer, only the Q2 front pointer is pointing to an entry with a status bit set to "active", therefore event C, pointed to by the Q2 front pointer, is selected for processing. In the example, as illustrated in sequence 612, the status bit for event C is set to "done" and the Q2 front pointer is incremented to "1", pointing to event D, as illustrated in queue status 614. In a next cycle, since the Q2 front pointer is still the only pointer pointing to an active entry, event D would be selected for processing, the status bit for event D would be set to "0", and the Q2 front pointer would be incremented, wrapping back to "0".

Figure 7A:
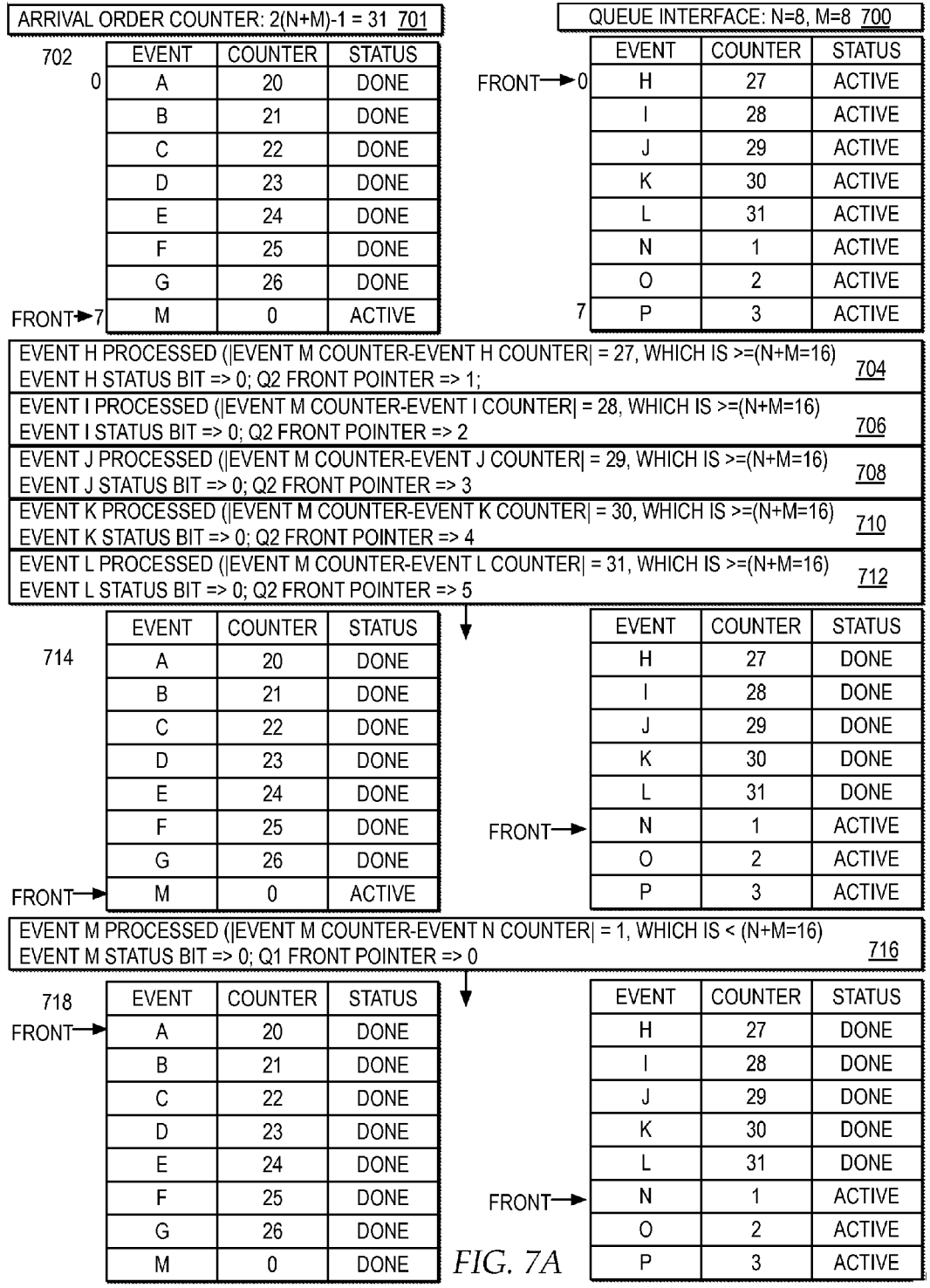

FIGS. 7A-7B illustrate a block diagram of one example of an order controller for tracking a relative arrival order of events being stored in multiple queues where the depth of each queue is set to eight entries. In the example, an event stream is illustrated for two queues, where N is set to a depth of eight entries and M is set to a depth of eight entries, as illustrated at reference numeral 700. In the example, an arrival order counter 701 is set to count to a value up to "2(N+M)−1", which is 31, and to wrap back to "0" on overflow.

In the example, as illustrated in a queue status 702, a first queue (Q1) currently includes a first event entry for event A with an order counter of "20" and a status bit set to "done", a second event entry for event B with an order counter of "21" and a status bit set to "done", a third event entry for event C with an order counter of "22" and a status bit set to "done", a fourth event entry for event D with an order counter of "23" and a status bit set to "done", a fifth event entry for event E with an order counter of "24" and a status bit set to "done", a sixth event entry for event F with an order counter of "25" and a status bit set to "done", a seventh event entry for event G with an order counter of "26" and a status bit set to "done", and an eighth event entry for event M with an order counter of "0" and a status bit set to "active". In addition, in the example, as illustrated in a queue status 702, a second queue (Q2) currently includes a first event entry for event H with an order counter of "27" and a status bit set to "active", a second event entry for event I with an order counter of "28" and a status bit set to "active", a third event entry for event J with an order counter of "29" and a status bit set to "active", a fourth event entry for event K with an order counter of "30" and a status bit set to "active", a fifth event entry for event L with an order counter of "31" and a status bit set to "active", a sixth event entry for event N with an order counter of "1" and a status bit set to "active", a seventh event entry for event O with an order counter of "2" and a status bit set to "active", and an eighth event entry for event P with an order counter of "3" and a status bit set to "active".

In the example, in queue status 702, the Q1 event pointer points to event M and the Q2 event pointer points to event H. In the example, as illustrated in sequence 704, from among event M and event H, each with a status bit set to "active", event H is selected to be processed next. In particular, in the example, the absolute value calculated is the absolute value of the difference between the event M order counter of "0" and the event H order counter of "27", which is "27". In the example, the absolute value of "7" is greater than "N+M", which is "4", therefore the entry with the larger order counter is selected for processing, which is entry H with the order counter of "27".

Similarly, events I, J, K, and L would be selected for processing before event M, as illustrated at reference numerals 706, 708, 710, and 712, because the absolute value calculated for the order counters pointed to at each step are greater than or equal to the counter midpoint value of "N+M". As a result of sequences 704, 706, 708, 710, and 712, the queue status changes from queue status 702 to a queue status 714, with the Q1 front pointer still pointing to event M with an order counter of "0" and the Q2 event pointer pointing to event N with an order counter of "1".

Next, as illustrated in sequence 716, event M is selected to be processed because the absolute value of the difference between the event M counter of "0" and the event N counter of "1" is "1", which is less than "N+M" of "16", therefore the event with the smaller counter value, or event M, is selected. In the example, as illustrated in sequence 716 and a queue status 718, the event M status bit is set to "0" and the Q1 front pointer is incremented and wraps back to 0.

Next, as illustrated in sequence 720, event N is selected to be processed because event N is the only event with a status bit set to active that is pointed to by a front pointer. In the example, as illustrated in sequence 720 and a queue status 720, the event N status bit is set to "0" and the Q2 front pointer is incremented to "6", pointing to event O. In a next cycle, since the Q2 front pointer is still the only front pointer pointing to an active entry, event O would be selected for processing, the status bit for event O would be set to "0", and the Q2 front pointer would be incremented to "7". Then, in a next cycle, since the Q2 front pointer is still the only front pointer pointing to an active entry, event P would be selected for processing, the status bit for event P set to "0" and the Q2 front pointer would be incremented, wrapping back to "0", and leaving no entry remaining with a status bit set to "1".

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Figures 10, 11:
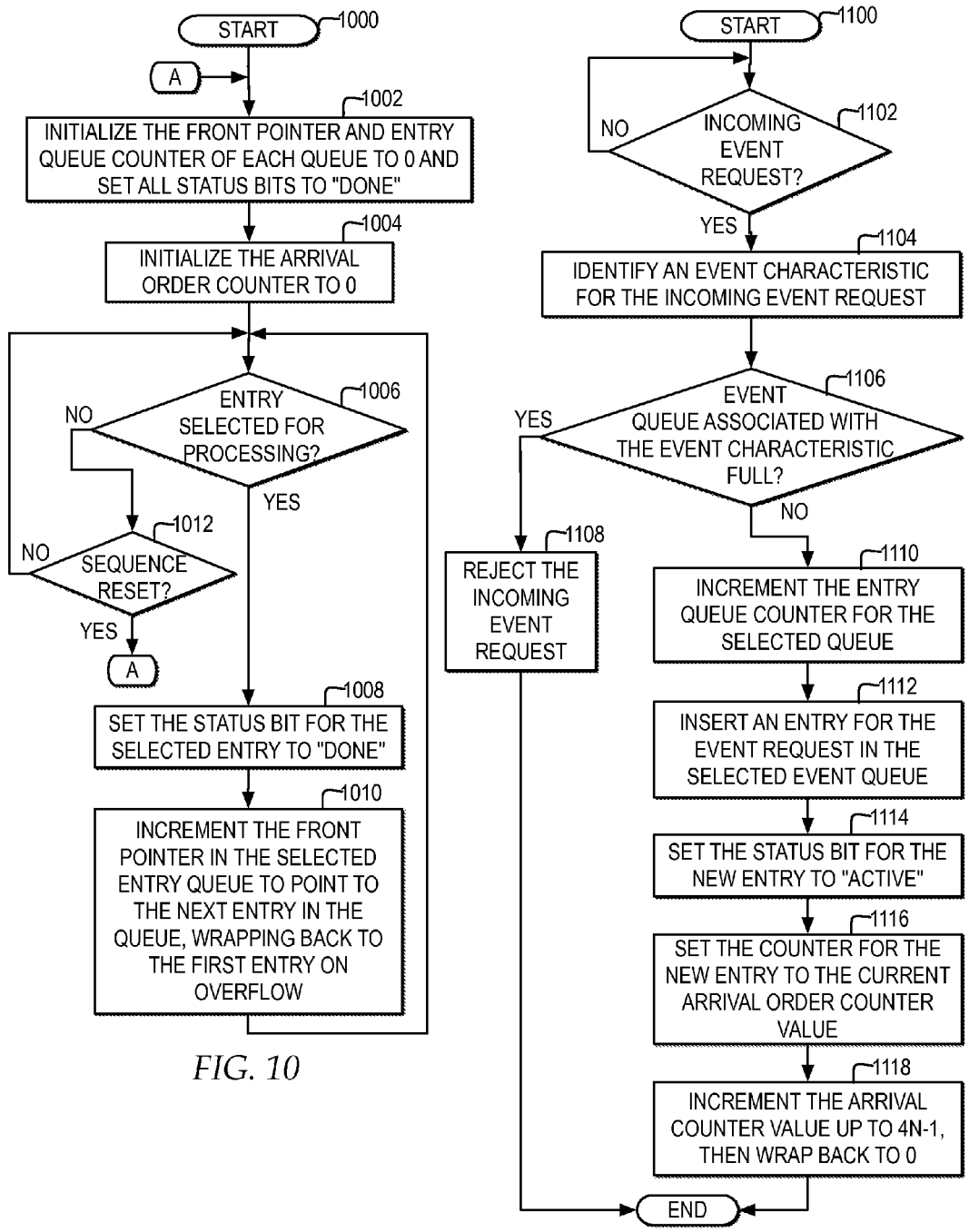
FIG. 10 illustrates a high level logic flowchart of a process and program for managing one or more counters and one or more pointers in a queue interface with multiple queues in which events are placed and in which the relative arrival order of events is tracked.
FIG. 11 illustrates a high level logic flowchart of a process and program for managing incoming event requests in a queue interface with multiple queues in which events are placed and in which the relative arrival order of events is tracked.
Figure 12:
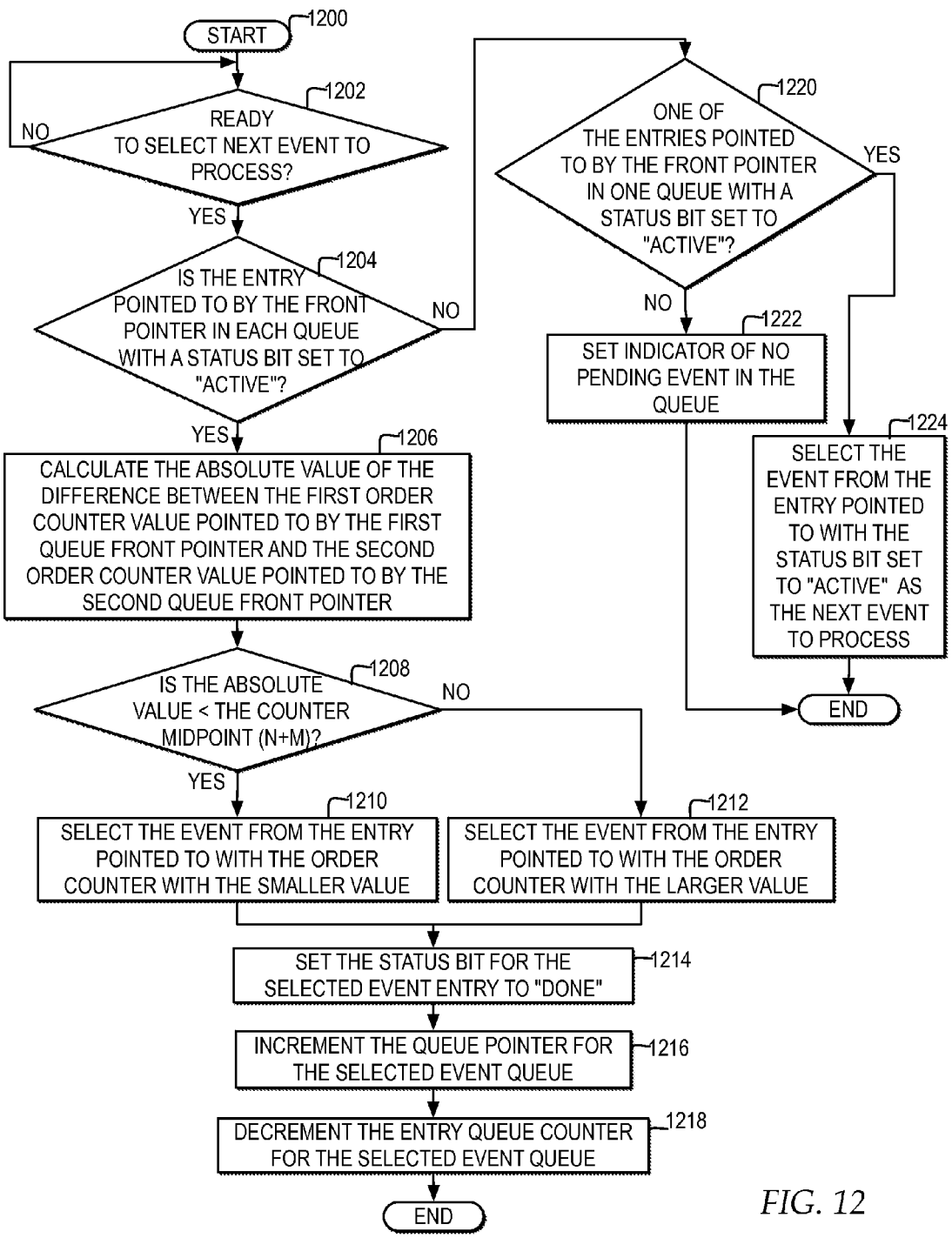
FIG. 12 illustrates a high level logic flowchart of a process and program for managing selection of a next event to process in a queue interface with multiple queues in which events are placed and in which the relative arrival order of events is tracked.

In one embodiment, the operations performed by processor 812 may control the operations of flowchart of FIGS. 10-12 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 100, including but not limited to processor 812, RAM 814, ROM 816, bus 822, and communication interface 832, or other components which may be integrated into one or more components of computer system 100, including, but not limited to, a memory core controller 920 as illustrated in FIG. 8, may contain hardwired logic for implementing order controller 112, receiving interface 104, queue interface 110, and processing interface 114 and for performing the operations of flowcharts of FIGS. 10-12.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 818, a random access memory (RAM), such as RAM 814, a read-only memory (ROM) 816, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 800, partly on the user's computer, as a stand-alone software package, partly on the user's computer and partly on a remote computer or entirely on the remote computer or server, such as server 840. In the latter scenario, the remote computer may be connected to the user's computer through any type of network, such as network 802, through a communication interface, such as network interface 832, over a network link that may be connected, for example, to network 802.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 800, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 800, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 832, the network link to network 802, and network 802 may use electrical, electromagnetic, or optical signals that carry digital data streams. The signals through the various networks and the signals on network 802, the network link to network 802, and network interface 832 which carry the digital data to and from computer system 800, may be forms of carrier waves transporting the information.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figure 9:
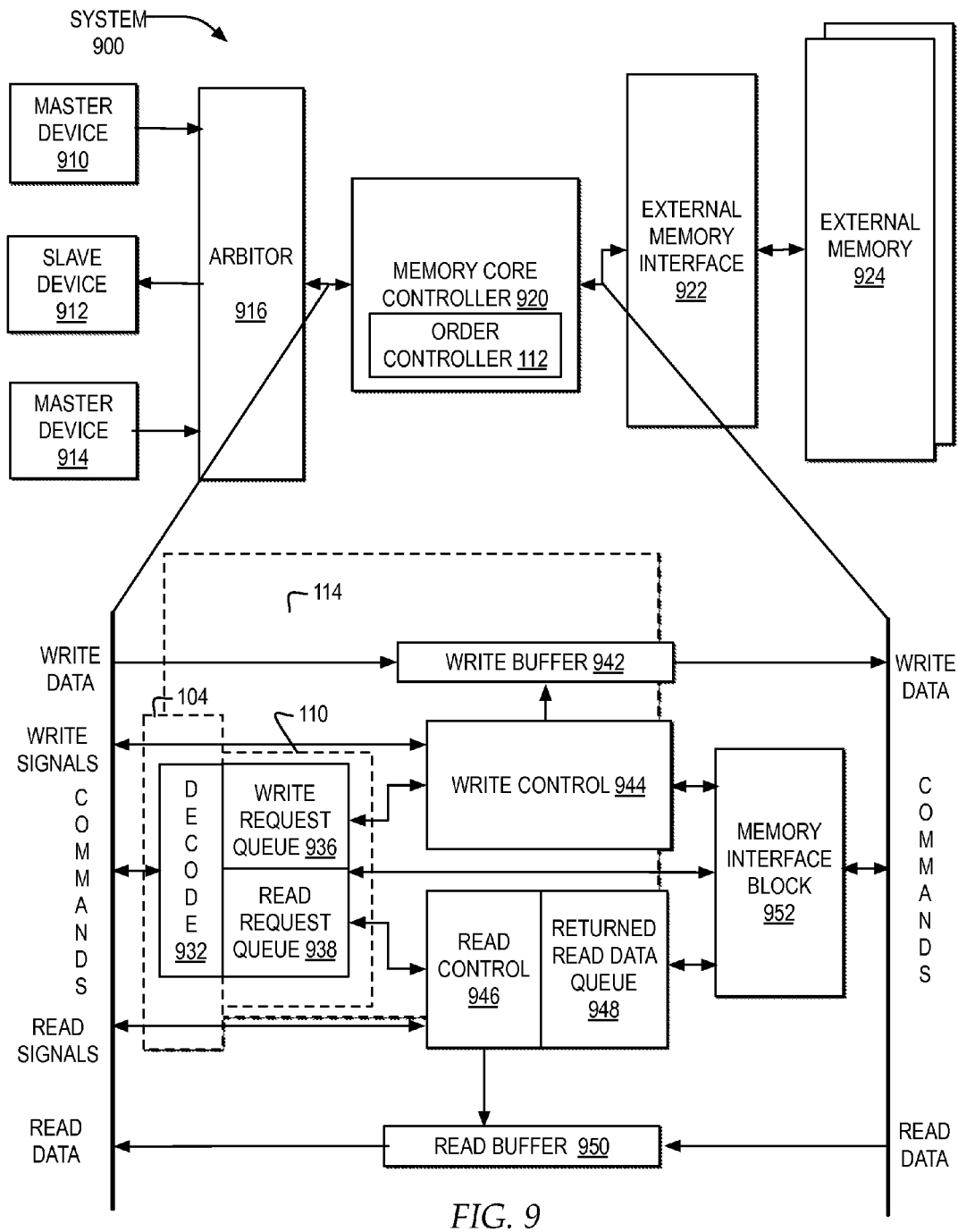

FIG. 9 is one example of a block diagram of a memory core controller including a queue interface with multiple queues in which events are placed and in which the relative arrival order of events is tracked.

In the example, a system 900 includes a memory core controller 920 that provides a mechanism to attach and interface one or more devices, such as a master device 910, a slave device 912, and a master device 914 to one or more external memory chips 924. In one example, master device 910, slave device 912, and master device 914 may include one or more of a processor local bus (PLB) master, PLB slave, a direct memory access (DMA) master, DMA slave, and an I/O master. In the example, an arbiter 916 interfaces with master device 910, slave device 912, and master device 914 and manages communications between each of the devices and memory core controller 920. In the example, the communications between each of the devices and memory core controller 920 may include write event requests, with a write command and write data, and read event requests, with a read command and read data. In the example, an external memory interface 922 interfaces between memory core controller 920 and one or more external memory chips 924. In one example, external memory interface 922 represents one or more double data rate (DDR), DDR2, and DDR3 synchronous dynamic random-access memory (SDRAM) interfaces and external memory chips 924 represents one or more DDR SDRAM, DDR2 SDRAM, and DDR3 SDRAM memories. External memory interface 922 may include drivers and receivers and may interface with a clock buffer between external memory interface 922 and external memory chips 924. In additional or alternate examples, external memory interface 922 may represent one or more interfaces for one or more additional or alternate types of memories and external memory 924 may represent one or more additional or alternate types of memories.

In the example, memory core controller 920 may provide a bridge between master device 910, slave device 912, and master device 914 and external memory chips 924 by managing read events requesting data from external memory 924 and write events requesting data be written to external memory 924. In one example, receiver interface 104 includes a decoder 932 for receiving commands from arbiter 916, identifying whether each command is a read command or a write command, and placing identified read commands in read request queue 938 and identified write commands in a write request queue 936, where queue interface 110 includes read request queue 938 and write request queue 936. In the example, processing interface 114 includes a write buffer 942 for buffering write data from arbiter 916, a read buffer 950 for buffering read data to be read by arbiter 916, a write control 944 for performing write control logic for arbiter 916, a read control 946 for performing read control logic for arbiter 916, a returned read data queue 948 for tracking returned read data from external memory interface 922, and a memory interface block 952 for interfacing with external memory interface 922.

In the example, memory core controller 920 includes order controller 112, as logic distributed throughout the components of memory core controller 920 for controlling the placement of commands received from arbiter 916 into read request queue 938 and write request queue 936 and for controlling the selection of commands to be processed next by external memory interface 922 from read request queue 938 and write request queue 938. In one example, the command to be processed next from read request queue and write request queue 938 is selected and passed to memory interface block 952 for processing by external memory interface 922.

FIG. 10 illustrates a high level logic flowchart of a process and program for managing one or more counters and one or more pointers in a queue interface with multiple queues in which events are placed and in which the relative arrival order of events is tracked. In the example, the process starts at block 1000 and thereafter proceeds to block 1002. Block 1002 illustrates initializing the front pointer and entry queue counter of each queue to "0" and setting all status bits in the queues to "done". Next, block 1004 illustrates initializing the arrival order counter to "0". Thereafter, block 1006 illustrates a determination whether an entry from among the multiple queues is selected for processing. At block 1006, if no entry is selected for processing, the process passes to block 1012. Block 1012 illustrates a determination whether a sequence reset is selected. At block 1012, if a sequence reset is selected, then the process returns to block 1002 and the pointers and counters are reset. At block 1012, if a sequence reset is not selected, then the process returns to block 1006.

Returning to block 1006, at block 1006, if an entry is selected for processing, then the process passes to block 1008. Block 1008 illustrates setting the status bit for the selected entry to "done". Next, block 1010 illustrates incrementing the front pointer in the selected entry queue to point to the next entry in the queue, wrapping back to the first entry on overflow, and the process returns to block 1006.

FIG. 11 illustrates a high level logic flowchart of a process and program for managing incoming event requests in a queue interface with multiple queues in which events are placed and in which the relative arrival order of events is tracked. In the example, the process starts at block 1100 and thereafter proceeds to block 1102. Block 1102 illustrates a determination whether an incoming event request is detected. At block 1102, if an incoming event request is detected, then the process passes to block 1104. Block 1104 illustrates identifying an event characteristic for the incoming event request. Next, block 1106 illustrates a determination of whether the event queue associated with the event characteristic is full. At block 1106, if the event queue associated with the event characteristic is full, then the process passes to block 1108. Block 1108 illustrates rejecting the incoming event request, and the process ends.

Returning to block 1106, at block 1106, if the event queue associated with the event characteristic is not full, then the process passes to block 1110. Block 1110 illustrates incrementing the entry queue counter for the selected queue. Thereafter, block 1112 illustrates inserting an entry for the event request in the selected event queue. Next, block 1114 illustrates setting the status bit for the new entry to "active". Thereafter, block 1116 illustrates setting the counter for the new entry to the current arrival order counter value. Next, block 1118 illustrates incrementing the arrival order counter value up to 4N−1, then wrapping back to 0 on overflow, and the process ends.

FIG. 12 illustrates a high level logic flowchart of a process and program for managing selection of a next event to process in a queue interface with multiple queues in which events are placed and in which the relative arrival order of events is tracked. In the example, the process starts at block 1200 and thereafter proceeds to block 1202. Block 1202 illustrates a determination whether the order controller is ready to select the next event to process. At block 1202, if the order controller is ready to select the next event to process, then the process passes to block 1204. Block 1204 illustrates a determination whether the entry pointed to by the front pointer in each queue has a status bit set to "active". At block 1204, if the entry pointed to by the front pointer in each queue has a status bit set to "active", then the process passes to block 1220. Block 1220 illustrates a determination whether one of the entries pointed to by the front pointer in one of the queues has a status bit set to "active". At block 1220, if only one of the entries pointed to by the front pointer in one of the queues has a status bit set to "active", then the process passes to block 1224. Block 1224 illustrates selecting the event from the entry pointed to with a status bit set to "active" as the next event to process, and the process ends. Returning to block 1220, at block 1220, if none of the entries pointed to by the front pointers in the queues have a status bit set to "active", then the process passes to block 1222. Block 1222 illustrates setting an indicator of no pending events in the queue, and the process ends.

Returning to block 1204, if the entry pointed to by the front pointer in each queue has a status bit set to "active", then the process passes to block 1206. Block 1206 illustrates calculating the absolute value of the difference between the first order counter value pointed to by the first queue front pointer and the second order counter value pointed to by the second queue front pointer. Next, block 1208 illustrates a determination whether the absolute value is less than "N+M". At block 1208, if the absolute value is less than "N+M", then the process passes to block 1210. Block 1210 illustrates selecting the event from the entry pointed to with the order counter with the smaller value, and the process passes to block 1214. Returning to block 1208, if the absolute value is not less than "N+M", then the process passes to block 1212. Block 1212 illustrates selecting the event from the entry pointed to with the order counter with the larger value, and the process passes to block 1214.

Block 1214 illustrates setting the status bit for the selected entry to "done". Next, block 1216 illustrates incrementing the queue pointer for the selected event queue. Thereafter, block 1218 illustrates decrementing the entry queue counter for the selected event queue, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for tracking a relative arrival order of a plurality of events stored in at least two queues, the system comprising:
    an order controller, implemented in at least one hardware component, operative to store each of a plurality of received events in a separate entry from among a plurality of entries in one of at least two queues with a separate counter value set from an arrival order counter at the time of storage, wherein the arrival order counter is incremented after storage of each of the plurality of received events and on overflow the arrival order counter wraps back to zero;
    the order controller operative to calculate an absolute value of the difference between a first counter value stored with an active first next entry from among the plurality of entries in a first queue from among the at least two queues and a second counter value stored with an active second next entry from among the plurality of entries in a second queue from among the at least two queues; and
    the order controller operative to compare the absolute value with a counter midpoint value to determine whether the first counter value was stored before the second counter value.

2. The system according to claim 1, wherein the order controller operative to calculate the absolute value with a counter midpoint value to determine whether the first counter value is ordered before the second counter value, further comprises:
    the order controller, responsive to the absolute value being less than the counter midpoint value, operative to select a smaller value of the first counter value and the second counter value as a selected value;
    the order controller, responsive to the absolute value being greater than or equal to the counter midpoint value, operative to select a larger value of the first counter value and the second counter value as the selected value; and
    the order controller operative to select a particular entry stored with the selected value for processing next.

3. The system according to claim 2, further comprising:
    the order controller, responsive to selecting the particular entry for processing next, operative to set a status bit stored with the particular entry from an active bit to a done bit and incrementing a pointer to point to a next entry in a particular queue from among the at least two queues with the particular entry.

4. The system according to claim 1, further comprising:
    the order controller operative to calculate the counter midpoint value set to a number of entries in the first queue added to a number of entries in the second queue.

5. The system according to claim 1, further comprising:
    the order controller operative to increment the arrival order counter up to a maximum counter value of a number of entries in the first queue summed with a number of entries in the second queue less one before overflowing and wrapping back to zero.

6. The system according to claim 1, further comprising:
a receiving interface of the order controller operative to receive each of the plurality of received events;
the order controller operative to determine a particular classification from among a plurality of event classifications of a particular event from among the plurality of received events;
the order controller operative to determine if a particular queue from among the at least two queues associated with the particular classification is full;
the order controller, responsive to determining the particular queue is full, operative to reject the particular event;
the order controller, responsive to determining the particular queue is not full, operative to store the particular event in the particular queue with a current value counted to in the arrival order counter; and
the order controller operative to increment the arrival order counter.

7. The system according to claim 6, wherein the order controller operative to determine a particular classification from among a plurality of event classifications of a particular event from among the plurality of received events, further comprises:
the order controller operative to determine the particular classification from among the plurality of event classifications comprising a read event and a write event.

8. The system according to claim 1, further comprising:
the order controller, responsive to the order controller being ready to select a next event to process, operative to determine whether a first status bit of a first next entry from among the plurality of entries in a first queue from among the at least two queues and a second status bit of a second next entry from among the plurality of entries in a second queue from among the at least two queues are both set to a done bit;
the order controller, responsive to both the first status bit and the second status bit being set to the done bit, operative to not process any entry;
the order controller, responsive to both the first status bit and the second status bit not being set to the done bit, operative to determine if only one of the first status bit and the second status bit is set to an active bit;
the order controller, responsive to only one of the first status bit and the second status bit being set to the active bit, operative to select the next event to process from the particular event from among the first next entry and the second next entry with particular event status bit set to the active bit; and
the order controller, responsive to both the first status bit and the second status bit being set to the active bit, operative to calculate the absolute value of the difference between the first counter value and the second counter value and comparing the absolute value with the counter midpoint value to determine whether the first counter value was stored before the second counter value.

9. The system according to claim 1, wherein the order controller operative to compare the absolute value with a counter midpoint value to determine whether the first counter value was stored before the second counter value further comprises:
the order controller operative to compare the absolute value with a counter midpoint value to determine whether the first counter value was stored before the second counter value independent of a sequential order of the first counter value compared with the second counter value.

10. A computer program product for tracking a relative arrival order of a plurality of events stored in at least two queues, the computer program product comprising:
one or more computer-readable tangible storage devices;
program instructions, stored on at least one of the one or more storage devices, to store each of a plurality of received events in a separate entry from among a plurality of entries in one of at least two queues with a separate counter value set from an arrival order counter at the time of storage, wherein the arrival order counter is incremented after storage of each of the plurality of received events and on overflow the arrival order counter wraps back to zero;
program instructions, stored on at least one of the one or more storage devices, to calculate an absolute value of the difference between a first counter value stored with an active first next entry from among the plurality of entries in a first queue from among the at least two queues and a second counter value stored with an active second next entry from among the plurality of entries in a second queue from among the at least two queues; and
program instructions, stored on at least one of the one or more storage devices, to compare the absolute value with a counter midpoint value to determine whether the first counter value was stored before the second counter value.

11. The computer program product according to claim 10, further comprising:
program instructions, stored on at least one of the one or more storage devices, responsive to the absolute value being less than the counter midpoint value, to select a smaller value of the first counter value and the second counter value as a selected value;
program instructions, stored on at least one of the one or more storage devices, responsive to the absolute value being greater than or equal to the counter midpoint value, to select a larger value of the first counter value and the second counter value as the selected value; and
program instructions, stored on at least one of the one or more storage devices, to select a particular entry stored with the selected value for processing next.

\* \* \* \* \*